United States Patent [19]

Seigle et al.

[11] Patent Number: 5,722,146
[45] Date of Patent: Mar. 3, 1998

[54] METHOD OF ASSEMBLING A SUCTION ACCUMULATOR IN A RECEIVER FOR A HEAT EXCHANGER

[75] Inventors: Adrian W. Seigle; Edward W. Bottum, Jr., both of Brighton, Mich.

[73] Assignee: Refrigeration Research, Inc., Brighton, Mich.

[21] Appl. No.: 628,084

[22] Filed: Apr. 8, 1996

[51] Int. Cl.⁶ ............................................. B23P 11/02
[52] U.S. Cl. ........................... 29/446; 29/890.06; 29/455.1
[58] Field of Search ............................... 29/890.06, 446, 29/455.1

[56] References Cited

U.S. PATENT DOCUMENTS

| | | |
|---|---|---|
| 3,064,344 | 11/1962 | Arne ................................. 29/446 |
| 3,084,523 | 4/1963 | Bottum et al. . |
| 3,212,289 | 10/1965 | Bottum . |
| 3,344,506 | 10/1967 | Bottum et al. . |
| 3,420,071 | 1/1969 | Bottum . |
| 3,443,367 | 5/1969 | Bottum . |
| 3,563,053 | 2/1971 | Bottum . |
| 3,589,395 | 6/1971 | Bottum . |
| 3,609,990 | 10/1971 | Bottum . |
| 3,626,715 | 12/1971 | Bottum . |
| 3,643,465 | 2/1972 | Bottum . |
| 3,643,466 | 2/1972 | Bottum . |
| 3,651,657 | 3/1972 | Bottum . |
| 3,837,177 | 9/1974 | Rockwell et al. . |
| 3,847,208 | 11/1974 | Ollendorf ......................... 29/455.1 |
| 3,872,689 | 3/1975 | Bottum . |
| 4,488,413 | 12/1984 | Bottum . |
| 5,075,967 | 12/1991 | Bottum . |
| 5,076,066 | 12/1991 | Bottum . |
| 5,167,128 | 12/1992 | Bottum . |
| 5,247,813 | 9/1993 | Bottum . |
| 5,479,790 | 1/1996 | Bottum, Jr. et al. . |

*Primary Examiner*—David P. Bryant
*Attorney, Agent, or Firm*—William J. Clemens

[57] ABSTRACT

A method of assembling a two-chamber component includes radially deforming an outer chamber to permit an inner chamber, which includes a fusible plug, to be inserted into the outer chamber. The inner chamber includes a fusible plug that extends radially away from the outside surface of the inner chamber. The fusible plug has a length that is greater than the radial distance between the inner and outer chambers. By radially deforming the outer chamber, it is possible to insert the inner chamber until the plug is radially and axially aligned with a radial opening in the outer chamber. Once the inner chamber is in proper position, the radial deformation is undone and the plug protrudes through the radial opening in the outer chamber, thereby permitting fluid communication from the inner chamber that is isolated from the contents of the outer chamber.

13 Claims, 1 Drawing Sheet

5,722,146

1

METHOD OF ASSEMBLING A SUCTION ACCUMULATOR IN A RECEIVER FOR A HEAT EXCHANGER

BACKGROUND OF THE INVENTION

This invention relates generally to two-chamber components and, more specifically to a method of assembling a two-chamber component that includes a fusible plug that extends outwardly from the inner chamber through the outer chamber.

In many applications, such as refrigeration systems, it is useful to place one chamber within another in order to form a single component. One example is placing a suction accumulator within a receiver in a refrigeration system. In such situations it is often necessary to have access to the inner chamber after it has been completely enclosed within the outer chamber.

For example, it is necessary to provide for fluid communication into and out of a suction accumulator that is contained within an outer chamber or tube. A fusible plug or similar structure is often desired for maintaining such fluid communication because of system tolerances and pressure levels that may exist within the accumulator, for example. It is also important, in some applications, to keep the outer chamber isolated from the inner chamber. In other words, it is often necessary to isolate the inner chamber from the contents of the outer chamber. Under these circumstances, it is imperative that the fusible plug extend from the inner chamber, through and beyond the outer chamber.

Assembling a two-chamber component, with the above-described goals and considerations in mind, has previously proved extremely difficult or, at best, unsatisfactory. The methodology associated with this invention provides an efficient and effective way to assemble a two-chamber component that provides for fluid communication from the inner chamber while concomitantly avoiding the introduction of any such fluid into the outer chamber.

SUMMARY OF THE INVENTION

In general terms, the methodology associated with this invention for assembling a two-chamber component having a first chamber within a second chamber includes four basic steps. The first chamber is assembled, which includes providing a plug on the first chamber that extends radially away from an outer surface on the first chamber. The plug permits fluid to be communicated from the inside of the first chamber. Secondly, the second chamber, which has a radial opening defined therethrough, is deformed from a normal cross-section. Next, the first chamber is inserted into the deformed second chamber such that the plug is radially and axially aligned with the radial opening. Lastly, the second chamber is allowed to return to the normal cross-section such that a portion of the plug is received through the radial opening to thereby permit fluid to be communicated from the first chamber and through the plug while isolating the interior of the second chamber from the first chamber.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

2

Figure 1:
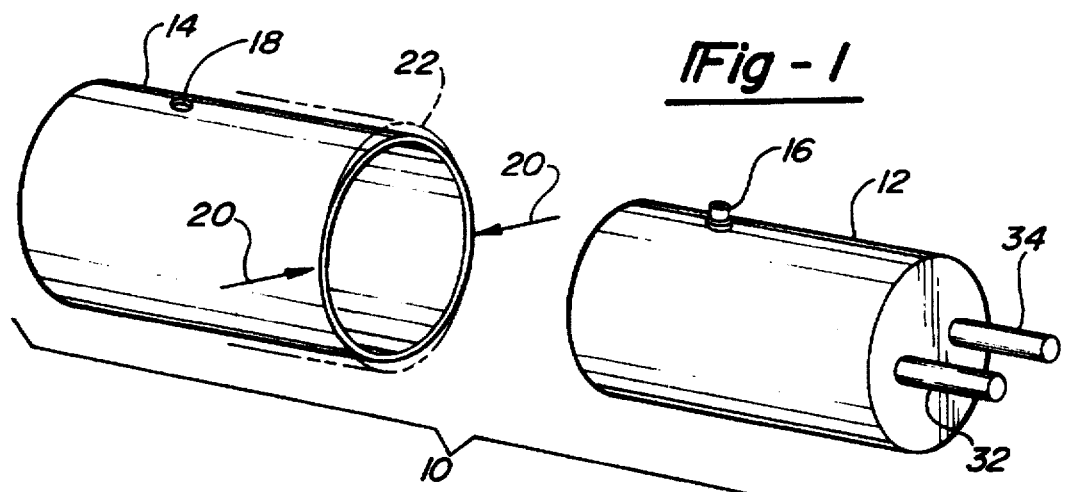
FIG. 1 is a diagrammatic perspective view of an unassembled suction accumulator and receiver to be assembled in accordance with the present invention.
Figure 2:
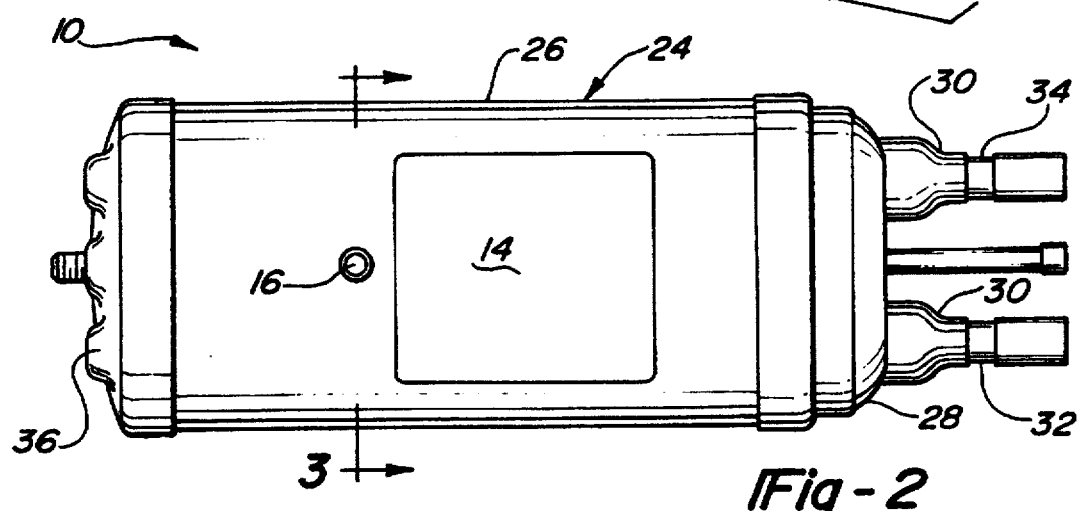
Figure 3:
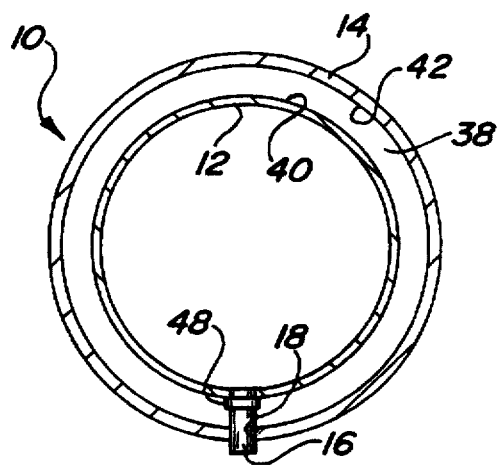

FIG. 2 is an front elevation view of the suction accumulator and receiver shown in the FIG. 1 assembled for use in a refrigeration system;

FIG. 3 is a cross-sectional view taken along the line 3—3 in the FIG. 2; and

Figure 4:
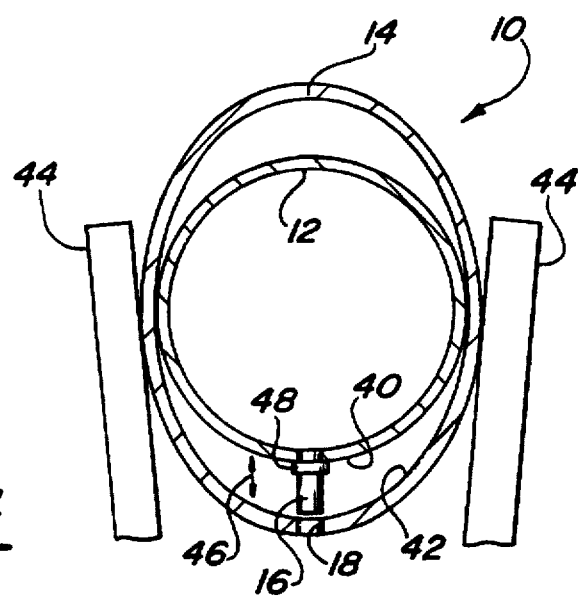

FIG. 4 is a cross-sectional view similar to the FIG. 3 showing the suction accumulator and receiver during a step of the assembly process as carried out in accordance with this invention.

DESCRIPTION OF THE PREFERRED EMBODIMENT

There is shown in the FIG. 1 illustrates two-chamber assembly 10 including a first or interior chamber 12 and a second or exterior chamber 14. The first chamber 12 is received within and is surrounded by the second chamber 14 when two-chamber assembly 10 is fully assembled. The first chamber 12 can be, for example, a suction accumulator and the second chamber 14 can be, for example, a receiver for use in a refrigeration system. A fusible plug 16, provided on the first chamber 12, is useful for permitting the communication of gas from the interior of the first chamber 12 to the atmosphere. The plug 16 has an internal wall (not shown) blocking such communication until the internal wall melts at a predetermined temperature to allow gas to escape and prevent an explosion. The plug 16 has one end retained in an aperture formed in a side wall of the first chamber 12. An opposite end of the plug 16 will extend through a radial opening 18 formed in a side wall of the second chamber 14 when the chambers are assembled.

In order for the fusible plug 16 to protrude through the radial opening 18 when the first chamber 12 is inserted within the second chamber 14, the plug must extend radially away from the side wall of the first chamber a distance that is greater than the radial spacing between the side wall of the first chamber and the side wall of the second chamber. In accordance with this invention, the second chamber 14 is radially deformed through the application of a compressive force along force lines 20, from a generally circular cross-sectional shape to a generally elliptical cross-sectional shape (indicated in phantom at 22). The radial deformation or elongation of the second chamber 14 from its normal cross section permits first chamber 12 and the plug 16 to fit within the interior of the second chamber so that the plug is aligned with the radial opening 18. Once the compressive force is released, and the second chamber 14 returns to its normal, preferably generally circular cross-sectional shape, and the plug 16 is received through the radial opening 18.

There is shown in the FIG. 2 a heat exchanger 24 for use in a refrigeration system. An outer body 26 of the heat exchanger 24 is formed by the second chamber 14. One end of the body 26 (the right end as shown in the FIG. 2) is closed by an end cap 28. A pair of nipples 30 provide passages through the end cap 28 and receive an inlet tube 32 and an outlet tube 34 attached to the first chamber 12. The inlet tube 32 and the outlet tube 34 allow for fluid communication between other system components and the interior of the first chamber 12, which is not specifically illustrated in the FIG. 2. The positioning of the inlet tube 32 and the outlet tube 34 through the nipples 30 mandates that the first chamber 12 be axially centered within the second chamber 14. In a construction such as that illustrated in the FIG. 2, it is especially difficult to assemble a first chamber within a second chamber where a fusible plug is required.

During the assembly process according to this invention, the first chamber 12 (not shown) is inserted into the second chamber 14 from an opposite end (the left end as shown in the FIG. 2) of the body 26 such that the inlet tube 32 and outlet tube 34 protrude through the nipples 30 and the plug 16 is radially and axially aligned with the radial opening 18. In order for the plug 16 to pass through the interior of the second chamber 14, it is necessary to radially deform the second chamber as generally described above. Once the plug 16 and the opening 18 are radially and axially aligned, the radial deformation force is released and the plug protrudes through the radial opening. The assembly can be completed by connecting an end cap 36 onto the opposite end of the body 26, to thereby close the heat exchanger 24. The end caps 28 and 36 are secured to the body 26 in a conventional manner, such as by soldering or brazing.

The FIG. 3 and the FIG. 4 illustrate, in more detail, the assembly process in accordance with this invention. The FIG. 3 is a cross-sectional view taken along the line 3—3 of the FIG. 2. It is apparent from the FIG. 3 that a predetermined amount of radial spacing 38 is present between an exterior surface 40 of the first chamber 12 and an interior surface 42 of the second chamber 14. As discussed above, the length of the plug 16 necessarily must exceed the radial spacing 38 in order to allow fluid to be released from the first chamber 12 through the plug without interfering with the contents of the second chamber 14. As previously identified, the plug 16 is preferably a fusible plug as is known in the art. For example, the U.S. Pat. No. 5,076,313, the teachings of which are incorporated into this specification by reference, shows a preferred type of fusible plug.

The FIG. 4 illustrates how a pair of clamp arms 44 can be used to apply a compressive force to radially deform the second chamber 14 during the assembly process according to this invention. As can be appreciated from the drawings, the second chamber 14 is radially deformed from a generally circular cross-sectional shape (shown in the FIG. 3) to a generally elliptical cross-sectional shape (shown in the FIG. 4). When the clamp arms 44 apply a compressive force to the chamber 14, in the direction of the force lines 20 shown in the FIG. 1, a radial spacing 46 is created along a perpendicular line between the exterior surface 40 of the first chamber 12 and the interior surface 42 of the second chamber. This increased radial spacing 46 permits the plug 16 to pass through the interior of the second chamber 14 until it is radially and axially aligned with the opening 18. When the compressive force, applied by the clamp arms 44 for example, is released, the second chamber 14 returns to the generally circular cross-sectional shape (shown in the FIG. 3) and the plug 16 protrudes through the radial opening 18.

The side wall of the second chamber 14 is resilient enough to withstand temporary radial deformation without compromising the integrity of the second chamber. Further, the second chamber 14 is preferably made from a material that is resilient enough to return to a normal shape or cross-section once the compressive force is removed. In at least one embodiment of the heat exchanger 24, the body 26 is made from a five inch outer diameter steel tube having a radial thickness of approximately 0.125 inches. Such a tube has proven useful when a conventional pair of vise jaws are used as the clamp arms 44.

In the illustrated embodiment, it is not possible to insert the plug 16 from outside of the second chamber 14 through the radial opening 18 after the first chamber 12 is inserted within the second chamber because the outer diameter of a flange 48 on the plug exceeds the diameter of the radial opening 18. The flange 48 is necessary to maintain a proper connection between the fusible plug 16 and the first chamber 12, for example. Therefore, an assembly procedure in accordance with this invention is required.

The preceding description is exemplary rather than limiting in nature. For example, although a suction accumulator within an outer housing or a receiver shell functioning as a heat exchanger in a refrigeration system is shown, other types of heat exchangers can be assembled in accordance with this invention. Pursuant to the provisions of the patent law, this invention has been described in what is currently considered the preferred embodiment. Variations and modifications will become apparent to those skilled in the art that do not depart from the purview and spirit of this invention, the scope of which is to be limited only by the appended claims.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method of assembling a two-chamber assembly having a first chamber within a second chamber, comprising the steps of:
   a. assembling a first chamber including providing a plug extending from an exterior surface on a side wall of the first chamber, the plug permitting fluid to be communicated from an interior of the first chamber, the plug extending radially away from the exterior surface on the first chamber;
   b. radially deforming a second chamber from a normal cross-sectional shape, the second chamber having a radial opening defined through a side wall thereof;
   c. inserting the first chamber into the deformed second chamber such that the plug is radially and axially aligned with the radial opening; and
   d. allowing the second chamber to return to the normal cross-sectional shape such that a portion of the plug is received through the radial opening to thereby permit fluid to be communicated from the interior of the first chamber and through the plug and to isolate an interior of the second chamber from the interior of the first chamber.

2. The method of claim 1, further comprising the step of sealingly closing the second chamber after the step d. is performed.

3. The method of claim 1, wherein the step a. is performed by the substep of providing a fusible plug as the plug extending from the side wall of the first chamber, and wherein the fusible plug extends radially away from the first chamber a distance that is greater than a distance between the exterior surface on the first chamber and an interior surface on the side wall of the second chamber.

4. The method of claim 1, wherein the step b. is performed by the substep of compressing the second chamber in a first radial direction such that the second chamber expands in a second radial direction, the first radial direction being generally perpendicular to the second radial direction.

5. The method of claim 1, wherein the second chamber has a generally cylindrical outer wall with a predetermined radius and wherein the step b. is performed by the substeps of radially compressing the outer wall in a first axial direction such that the radius of the outer chamber is decreased from the predetermined radius in the direction of the compression.

6. The method of claim 1, wherein the step c. is performed by the substeps of coaxially aligning the first chamber and the second chamber and radially aligning the plug with the opening in the side wall of the second chamber.

7. The method of claim 6, wherein the step c. is performed by the further sub-step of inserting the first chamber into the interior of the second chamber until the plug and the opening are axially aligned.

8. The method of claim 1, wherein the step c. is performed by the substep of applying a radially compressive force to the second chamber and the step d. is performed by the substep of releasing the compressive force.

9. A method of assembling a first generally tubular chamber within a second generally tubular chamber when the first chamber includes a plug that extends radially away from an exterior surface of a side wall of the first chamber a distance that is greater than a radial distance between an interior surface on a side wall of the second chamber and the exterior surface on the first chamber and the second chamber includes a radial opening, comprising the steps of:

a. aligning the first and second chambers along a common axis;

b. radially aligning the plug and the radial opening;

c. temporarily radially elongating a portion of the second chamber that includes the radial opening beyond a nominal radius;

d. inserting the first chamber into the second chamber such that the plug moves within the elongated portion of the second chamber;

e. axially aligning the plug and the radial opening; and f. relaxing the portion of the second chamber that was elongated in the step c. to thereby allow said portion to return to the nominal radius such that the plug protrudes through the radial opening in the second chamber to thereby permit fluid communication between an interior of the first chamber and an exterior of the second chamber.

10. The method of claim 9, wherein the step f. further comprises the substep of sealingly isolating the interior of the second chamber from the interior of the first chamber.

11. The method of claim 9, wherein the step c. is performed by the substep of applying a compressive force in a direction that is generally perpendicular to a direction of the elongation.

12. The method of claim 11, wherein the compressive force is applied, using two moving members that move radially inward against the exterior of the second chamber at diametrically opposed points.

13. The method of claim 11, wherein the step f. is performed by the substeps of releasing the compressive force applied in the step c. and allowing a portion of the plug to pass through the radial opening as the portion of the second chamber returns to the nominal radius.

* * * * *